(12) United States Patent
Kudo et al.

(10) Patent No.: US 12,230,949 B2
(45) Date of Patent: Feb. 18, 2025

(54) WIRING MEMBER

(71) Applicant: Sumitomo Wiring Systems, Ltd., Mie (JP)

(72) Inventors: Ryusuke Kudo, Mie (JP); Tetsuya Nishimura, Mie (JP); Masaki Mizushita, Mie (JP); Haruka Nakano, Mie (JP); Kenta Arai, Mie (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 332 days.

(21) Appl. No.: 17/774,696

(22) PCT Filed: Oct. 28, 2020

(86) PCT No.: PCT/JP2020/040373
§ 371 (c)(1),
(2) Date: May 5, 2022

(87) PCT Pub. No.: WO2021/095522
PCT Pub. Date: May 20, 2021

(65) Prior Publication Data
US 2022/0407295 A1 Dec. 22, 2022

(30) Foreign Application Priority Data
Nov. 14, 2019 (JP) .................................. 2019-206154

(51) Int. Cl.
*H02G 3/04* (2006.01)
*B60R 16/02* (2006.01)
*H01B 7/40* (2006.01)

(52) U.S. Cl.
CPC ....... *H02G 3/0406* (2013.01); *B60R 16/0215* (2013.01); *H01B 7/40* (2013.01); *H02G 3/0437* (2013.01)

(58) Field of Classification Search
CPC .. B60R 16/0207; B60R 16/0215; H02G 3/04; H02G 3/0406; H01R 13/01254;
(Continued)

(56) References Cited

U.S. PATENT DOCUMENTS 3,733,428 A * 5/1973 Fry ...................... H01B 7/0846
156/290
2009/0122509 A1 * 5/2009 Castillo Garcia ...... H05K 1/118
361/827
(Continued)

FOREIGN PATENT DOCUMENTS

CN 202917198 * 5/2013 ............... H01B 7/00
JP 2002-112440 4/2002
(Continued)

OTHER PUBLICATIONS

International Search Report issued in International Patent Application No. PCT/JP2020/040373, dated Dec. 28, 2020, along with an English translation thereof.

*Primary Examiner* — Paresh Paghadal
(74) *Attorney, Agent, or Firm* — Greenblum & Bernstein, P.L.C.

(57) ABSTRACT

A wiring member includes: a main wire including a plurality of wire-like transmission members; a branch wire in which some of the wire-like transmission members are branched from the main wire; a fixing sheet having one main surface to which the main wire is fixed; and a cover sheet, at least a part of which is provided in a position overlapped with the branch wire in another main surface of the fixing sheet, wherein a fusion position where the fixing sheet and the cover sheet are fused is provided on at least a lateral side of the main wire in a longitudinal direction, and is provided in a position away from the branch wire.

11 Claims, 4 Drawing Sheets

(58) Field of Classification Search
CPC .......... H01B 7/08; H01B 7/40; H01B 7/0846; H01B 7/0045
See application file for complete search history.

(56) References Cited

U.S. PATENT DOCUMENTS

| | | | | |
|---|---|---|---|---|
| 2011/0030832 A1* | 2/2011 | Larson | ................. | G02B 6/4459 |
| | | | | 138/137 |
| 2014/0283989 A1* | 9/2014 | Takano | ............... | B32B 37/1018 |
| | | | | 156/285 |
| 2017/0327060 A1* | 11/2017 | Nakajima | ........ | H01B 13/01254 |
| 2019/0392963 A1 | 12/2019 | Ishida et al. | | |
| 2020/0070749 A1 | 3/2020 | Mizuno et al. | | |
| 2020/0091689 A1* | 3/2020 | Kisu | ................. | B60R 16/0215 |

FOREIGN PATENT DOCUMENTS

| | | |
|---|---|---|
| JP | 2018-137208 | 8/2018 |
| WO | 2014/038259 | 3/2014 |
| WO | 2018/207641 | 11/2018 |

* cited by examiner

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Patent Application Laid-Open No. 2018-137208

SUMMARY

Problem to be Solved by the Invention

In a wire harness described in Patent Document 1, there is a case where the other sheet is desired to be fused to a functional exterior member, however, there is a case where fusion is hardly performed at a time of fusing the other sheet to the functional exterior member. For example, there is a case where the other sheet is hardly fused to the functional exterior member favorably when a jig for fusion catches a wire-like transmission member at a time of fusing the other sheet to the functional exterior member.

Accordingly, an object is to provide a technique capable of favorably fusing the other sheet to a sheet to which a wire-like transmission member is fixed.

Means to Solve the Problem

A wiring member according to the present disclosure is a wiring member including: a main wire including a plurality of wire-like transmission members; a branch wire in which some of the wire-like transmission members are branched from the main wire; a fixing sheet having one main surface to which the main wire is fixed; and a cover sheet, at least a part of which is provided in a position overlapped with the branch wire in another main surface of the fixing sheet, wherein a fusion position where the fixing sheet and the cover sheet are fused is provided on at least a lateral side of the main wire in a longitudinal direction, and is provided in a position away from the branch wire.

Effects of the Invention

According to the present disclosure, the other sheet can be favorably fused to the sheet to which the wire-like transmission member is fixed.

DESCRIPTION OF EMBODIMENT(S)

Description of Embodiment of Present Disclosure

Figure 1:
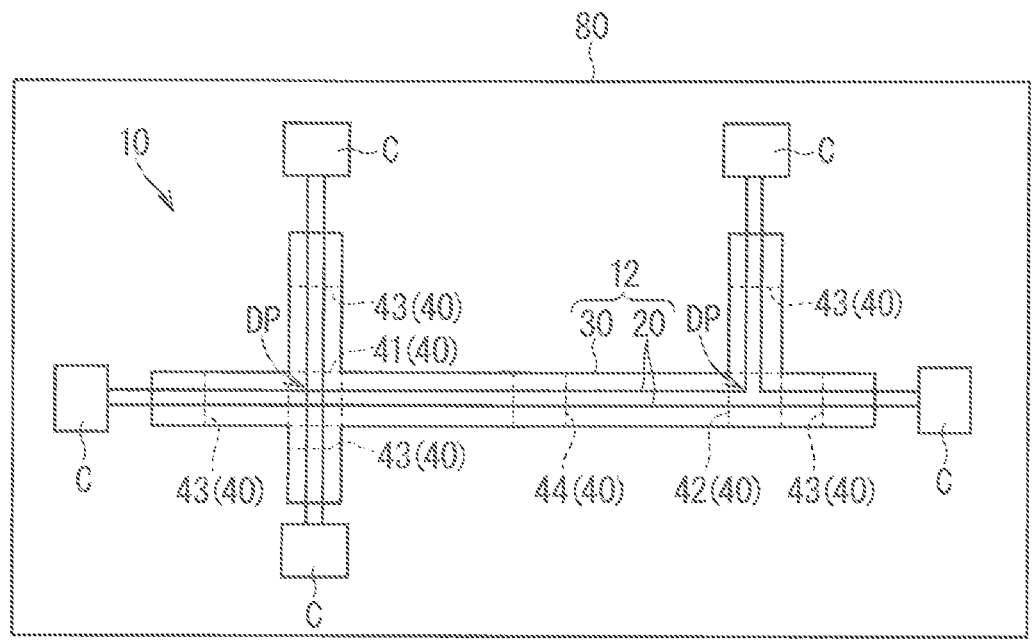
FIG. 1 is a schematic plan view illustrating a wiring member according to an embodiment.

Embodiments of the present disclosure are listed and described firstly.

A wiring member according to the present disclosure is as follows.

(1) A wiring member includes: a main wire including a plurality of wire-like transmission members; a branch wire in which some of the wire-like transmission members are branched from the main wire; a fixing sheet having one main surface to which the main wire is fixed; and a cover sheet, at least a part of which is provided in a position overlapped with the branch wire in another main surface of the fixing sheet, wherein a fusion position where the fixing sheet and the cover sheet are fused is provided on at least a lateral side of the main wire in a longitudinal direction, and is provided in a position away from the branch wire. It is also considered that the fixing sheet and the cover sheet are fused after the wire-like transmission member is fixed to the fixing sheet. Even in this case, the fusion position where the cover sheet and the fixing sheet are fused is provided in a position away from the branch part, thus an operation for fusion is easily performed. For example, it is suppressed that a jig for fusion catches the wire-like transmission member at a time of fusing the fixing sheet to the cover sheet. Accordingly, the other cover sheet can be favorably fused to the fixing sheet to which the wire-like transmission member is fixed.

(2) The fusion position where the fixing sheet and the cover sheet are fused may be provided on at least both ends of a lateral side of the main wire in a longitudinal direction. Accordingly, the fixing sheet and the cover sheet are fused at a position sandwiching the main wire.

(3) The cover sheet may include a branch cover portion overlapped with a branch portion in which some of the wire-like transmission members are branched from the main wire. Accordingly, the branch portion is also covered by the cover sheet.

(4) Fusion positions where the fixing sheet and the cover sheet are fused in the branch cover portion may be provided in a plurality of positions surrounding the branch portion. Accordingly, the fixing sheet and the cover sheet are rigidly fixed to each other in the branch cover portion.

(5) The cover sheet may be partially provided along a longitudinal direction of the fixing sheet. Accordingly, increase in weight of the wiring member caused by providing the cover sheet is suppressed.

(6) It is also applicable that the cover sheet includes a first partial sheet and a second partial sheet provided at intervals along the longitudinal direction of the fixing sheet, the first partial sheet covers a region including a branch portion in which some of the plurality of wire-like transmission members are branched from the main wire, the second partial sheet covers a region including a parallel portion in which some of the wire-like transmission members in the plurality of wire-like transmission members are parallelly arranged, and fusion positions where the second partial sheet and the fixing sheet are fused may be provided on both lateral sides of the parallel portion. Accordingly, the first partial sheet and the second partial sheet can be favorably fused to the fixing sheet.

(7) It is also applicable that the fixing sheet includes a first route portion and a second route portion branched from the first route portion, some of the wire-like transmission members in the plurality of wire-like transmission members are branched from another some of the wire-like transmission members in the first route portion and fixed on the second route portion, and a part of the cover sheet covering a branch portion covers only the first route portion in the first route portion and the second route portion. Accordingly, reduced is a region where the portion covering the branch is provided in the fixing sheet.

(8) It is also applicable that the fixing sheet includes a first route portion and a second route portion branched from the first route portion, some of the wire-like transmission members in the plurality of wire-like transmission members are branched from another some of the wire-like transmission members in the first route portion and extend along the second route portion, and a part of the cover sheet covering a branch portion is formed into a branched shape to cover both the first route portion and the second route portion. Accordingly, the part of the cover sheet covering the branch also has a branched shape.

(9) It is also applicable that some of the wire-like transmission members in the plurality of wire-like transmission members are branched from another some of the wire-like transmission members on the fixing sheet in a branch portion, and extend to an outer side from a side edge of the fixing sheet. Accordingly, reduced is a region where the fixing sheet and the cover sheet are provided on the wire-like transmission member, and increase in weight of the wiring member can be suppressed.

(10) The cover sheet may have higher rigidity than the fixing sheet. Accordingly, a shape of the wiring member is held by the cover sheet.

(11) It is also applicable that a double-sided adhesive member is attached to an outer surface of the cover sheet, and the double-sided adhesive member may be overlapped with a branch portion. Accordingly, the double-sided adhesive member is provided in a relatively large region.

(12) Adhesive force between the outer surface and the double-sided adhesive member may be larger than adhesive force between the another main surface and the double-sided adhesive member. Accordingly, fixing strength is higher in a case where the wiring member is attached and fixed to an adherend by an adhesive agent than in a case where an adhesive agent is provided on the fixing sheet.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment

Figure 2:
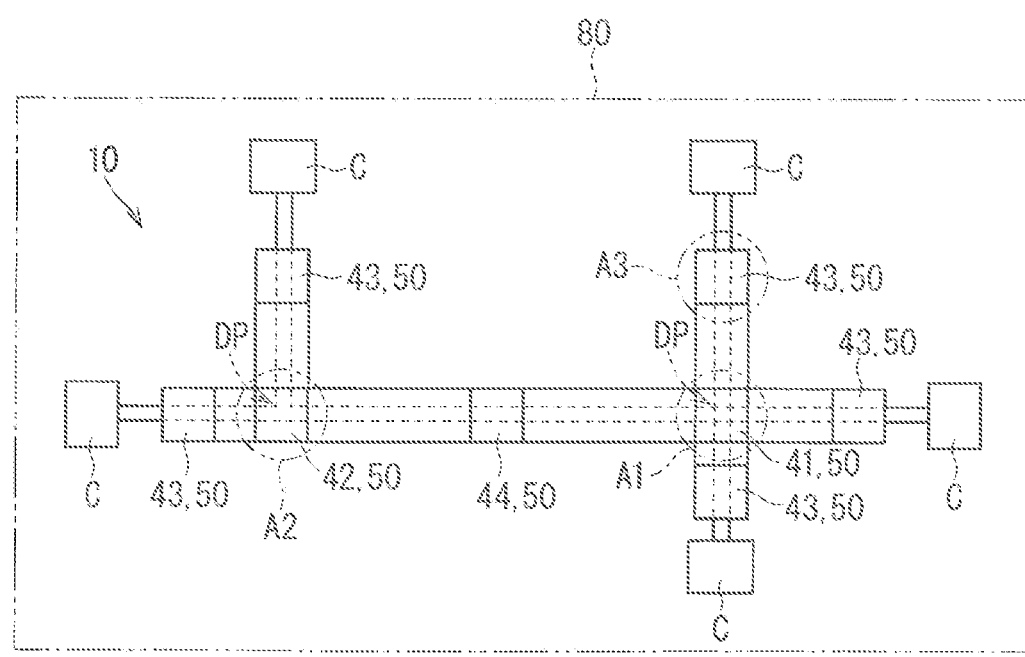
FIG. 2 is a schematic back view illustrating the wiring member according to the embodiment.
Figure 3:
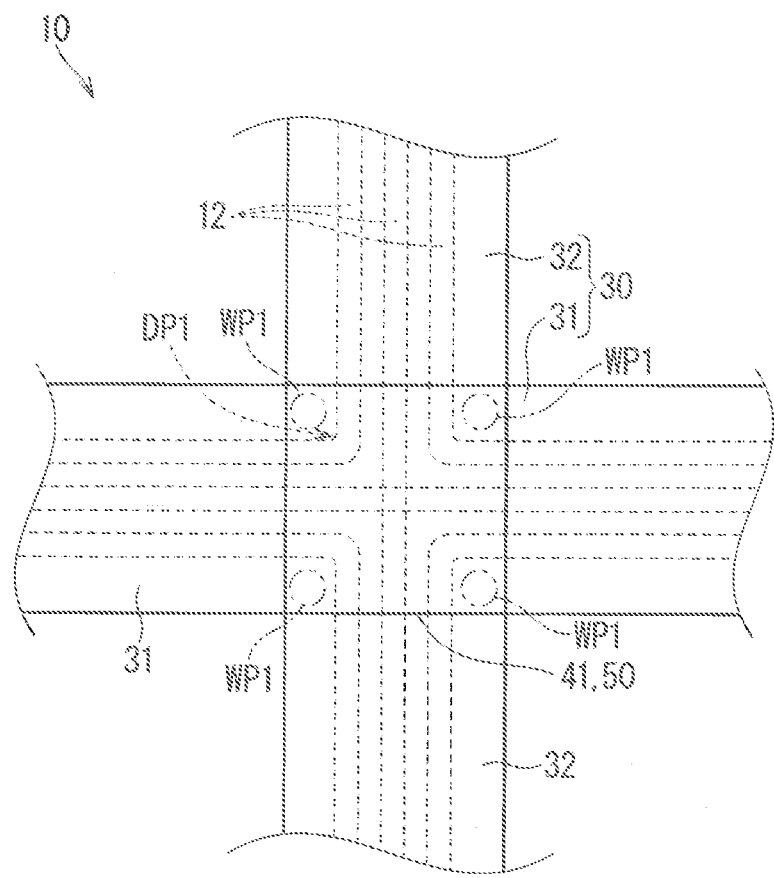
FIG. 3 is a schematic enlarged view of a region A1 in FIG. 2.
Figure 4:
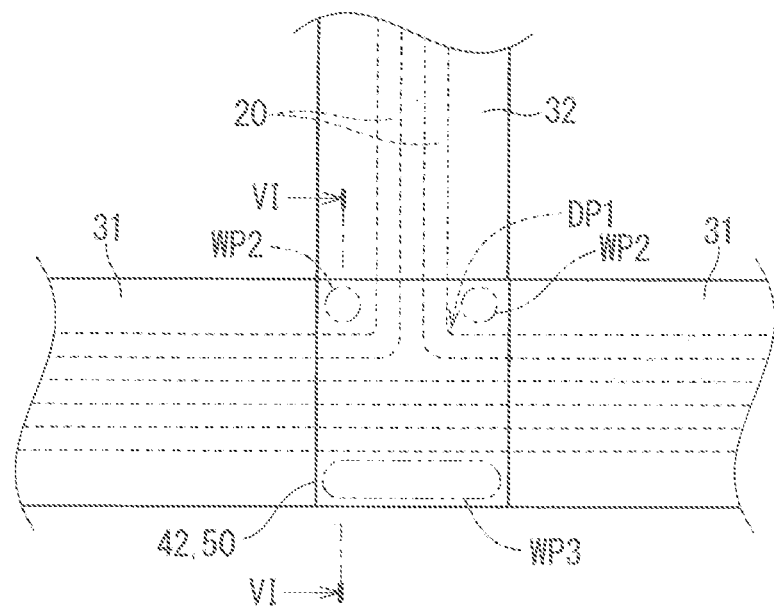
FIG. 4 is a schematic enlarged view of a region A2 in FIG. 2.
Figure 5:
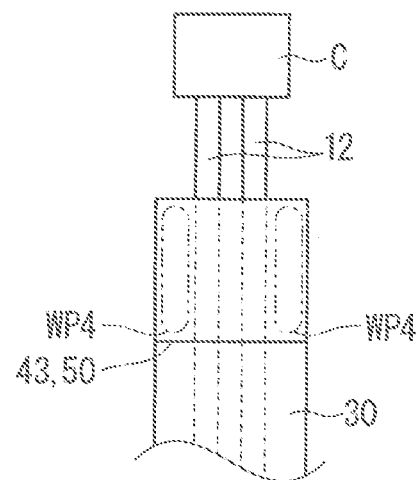
FIG. 5 is a schematic enlarged view of a region A3 in FIG. 2.
Figure 6:
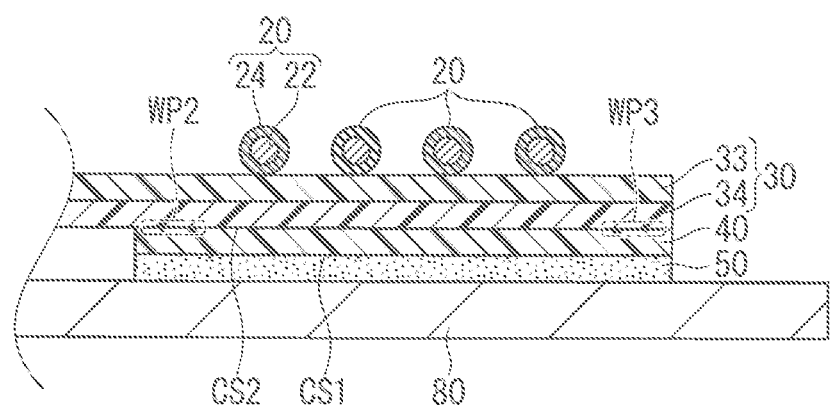
FIG. 6 is a schematic cross-sectional view along a VI-VI line in FIG. 4.

A wiring member according to an embodiment is described hereinafter. FIG. 1 is a schematic plan view illustrating a wiring member 10 according to the embodiment. FIG. 2 is a schematic back view illustrating the wiring member 10 according to the embodiment. FIG. 3 is a schematic enlarged view of a region A1 in FIG. 2. FIG. 4 is a schematic enlarged view of a region A2 in FIG. 2. FIG. 5 is a schematic enlarged view of a region A3 in FIG. 2. FIG. 6 is a schematic cross-sectional view along a VI-VI line in FIG. 4.

The wiring member 10 includes a wiring body 12 and a cover sheet 40. The wiring member 10 further includes a double-sided adhesive member 50. The wiring member 10 is attached to an adherend 80 by the double-sided adhesive member 50. The wiring member 10 is mounted to a vehicle, for example. The adherend 80 is a member to be fixed to the wiring member 10 in a vehicle. The adherend 80 is a body frame, a body panel, and an interior panel, for example.

The wiring body 12 includes a wire-like transmission member 20 and a fixing sheet 30. At least one wire-like transmission member 20 is included. Herein, the plurality of wire-like transmission members 20 are included. Each wire-like transmission member 20 is a wire-like member transmitting an electrical power or light, for example. The fixing sheet 30 is formed into a flat shape as a whole. The plurality of wire-like transmission members 20 are fixed to the fixing sheet 30, thus the wiring body 12 is kept in a flat state. In the example illustrated in FIG. 6, the plurality of wire-like transmission members 20 having the same diameter and structure are disposed on one fixing sheet 30. However, the diameter and the structure of each of the plurality of wire-like transmission members 20 may be appropriately set, thus the wire-like transmission members 20 each having a different diameter and a structure, for example, may be disposed on the same fixing sheet 30.

The plurality of wire-like transmission members 20 are assumed to be members connecting components in a vehicle. A connector C, for example, is provided on an end portion of the wire-like transmission member 20. This connector C is connected to a connector provided in the other side component, thus the wire-like transmission member 20 is connected to the other side component. That is to say, the present wiring member 10 is used as the wiring member 10 electrically connecting various types of component in a vehicle, for example (or connecting them so that they can perform optical communication). The connector C may be fixed to the fixing sheet 30.

Routes of the plurality of wire-like transmission members 20 are set in accordance with a position of a component to which the wire-like transmission members 20 are connected. The plurality of wire-like transmission members 20 are fixed to the fixing sheet 30, thus the plurality of wire-like transmission members 20 are kept in a form following a wiring route corresponding to a position of a component as a connection destination of each wire-like transmission member 20. The plurality of wire-like transmission members 20 may be fixed to the fixing sheet 30 in a state where a branch wire is branched from a main wire. The fixing sheet 30 may also be formed in a shape in which a portion to which the branch wire is fixed is branched from a portion to which the main wire is fixed. Herein, the plurality of wire-like transmission members 20 are branched on the fixing sheet 30. A portion where some of the wire-like transmission members 20 are branched from the other some of the wire-like transmission members 20 in the plurality of wire-like transmission members 20 are referred to as a branch portion DP. As illustrated in FIG. 3 and FIG. 4, two branch portions DP1 and DP2 are located on the fixing sheet 30 herein.

The fixing sheet 30 includes a first route portion 31 and a second route portion 32 in positions corresponding to the branch portions DP1 and DP2, respectively. The second route portion 32 is a portion branched from the first route portion 31. Some of the wire-like transmission members 20 in the plurality of wire-like transmission members 20 are branched from the other some of the wire-like transmission members 20 in the first route portion 31, and fixed on the second route portion 32. The first route portion is a portion where the main wire is fixed. The second route portion is a portion where the branch wire is fixed. The main wire includes a branch wire branched from a part of the main wire. The main wire includes a plurality of wire-like transmission members as a base of a branch of the branch wire, and the main wire can be considered a wire-like transmission member (or a plurality of wire-like transmission members) having larger weight than the branch wire and a wire-like transmission member (or a plurality of wire-like transmission members) which is larger in number than the branch wire, for example. The main wire may be considered a wire-like transmission member (or a plurality of wire-like transmission members) longer than the branch wire.

The wire-like transmission member 20 includes a transmission wire body 22 and a covering layer 24. The transmission wire body 22 transmits an electrical power or light, for example. The covering layer 24 covers the transmission wire body 22. For example, the wire-like transmission member 20 may be a general wire having a core wire and a covering layer around the core wire, or may also be a shielded wire, a twisted wire, an enamel wire, a nichrome wire, or an optical fiber.

The wire-like transmission member 20 transmitting the electrical power may be various kinds of signal lines or various kinds of power lines. Some of the wire-like transmission members 20 transmitting the electrical power may be used as an antenna or coil, for example, transmitting or receiving a signal or electrical power to or from a space.

) The wire-like transmission member 20 may be a single wire-like object or a composite object of a plurality of wire-like objects (a twisted wire and a cable made up of a plurality of wire-like objects covered by a sheath).

The wire-like transmission member 20 is fixed to a main surface of the fixing sheet 30. The fixing sheet 30 may be a resin sheet. For example, the fixing sheet 30 may be formed of resin such as polyvinyl chloride (PVC), polyethylene (PE), polypropylene (PP), or polyethylene terephthalate (PET). The fixing sheet 30 may be a sheet having an evenly filled cross-sectional surface. The fixing sheet 30 is also considered a fibrous material such as a braided cloth, a woven cloth, or a non-woven cloth, for example. The fixing sheet 30 is also considered a foam sheet, for example. The fixing sheet 30 may have a single layer structure, or may also have a multilayer structure. The fixing sheet 30 may include a metal layer.

Herein, the fixing sheet 30 includes a first layer 33 and a second layer 34 stacked on each other. The fixing sheet 30 has a double layer structure. The fixing sheet 30 does not include a layer other than the first layer 33 and the second layer 34. The fixing sheet 30 may have a three or more layer structure. The fixing sheet 30 may include a layer other than the first layer 33 and the second layer 34.

The first layer 33 may be a resin layer having an evenly filled cross-sectional surface evenly filled with resin. The wire-like transmission member 20 is fixed to the first layer 33. The first layer 33 is a fixing layer. Resin as a material of the first layer 33 is the same as that of the covering layer 24, for example. One surface of the first layer 33 is one main surface of the fixing sheet 30.

The second layer 34 is a fibrous material layer. The cover sheet 40 is fixed to the second layer 34. One surface of the second layer 34 is the other main surface of the fixing sheet 30.

The first layer 33 and the second layer 34 are fixed to each other while the other surface of the first layer 33 and the other surface of the second layer 34 have contact with each other. A fixing state of the first layer 33 and the second layer 34 is not particularly limited, however, fixing by fusion or adhesion is preferable. Particularly, the first layer 33 as a resin layer and the second layer 34 as a fibrous material layer are preferably fixed by resin of the resin layer or an adhesive agent penetrating between fibers in the fibrous material layer. Such a configuration causes so-called anchor effect, thus the first layer 33 and the second layer 34 are rigidly fixed. Herein, the first layer 33 and the second layer 34 are fused to each other. That is to say, the resin of the first layer 33 as the resin layer in a fluent state penetrates between the fibers of the second layer 34 as the fibrous material layer, and is then hardened. Maintained accordingly is a state where the resin of the resin layer penetrates between the fibers of the fibrous material layer, and the first layer 33 and the second layer 34 are fixed to each other. The first layer 33 and the second layer 34 are formed to have the same size. One of the first layer 33 and the second layer 34 may also be formed to be larger than the other one thereof. The first layer 33 and the second layer 34 are wholly fixed at a region where they have contact with each other. The first layer 33 and the second layer 34 may also be fixed only at a part of a region where they have contact with each other.

The fixing sheet 30 may be a flexible member. For example, the first layer 33 is a resin layer having an evenly filled cross-sectional surface made up of flexible resin such as soft PVC as a material, the second layer 34 is a non-woven cloth made up of PET as a material, and the fixing sheet 30 is a flexible member. For example, the fixing sheet 30 may have a plastic property so as to be able to follow bending of the wire-like transmission member 20. That is to say, it is also applicable that the wiring body 12 can be bent in a thickness direction (bending so that a fold line follows the main surface of the fixing sheet 30).

A fixing structure of the wire-like transmission member 20 fixed to the fixing sheet 30 is not particularly limited as long as the wire-like transmission member 20 is fixed to the fixing sheet 30. Applicable as the fixing state are a contact area fixation and a non-contact area fixation, or both fixations may be used together. Herein, the contact area fixation indicates that a portion where the wire-like transmission member 20 and the fixing sheet 30 have contact with each other is stuck and fixed. The non-contact area fixation is a fixing state which is not the contact area fixation, and indicates that a sewing thread, a cover, or an adhesive tape presses the wire-like transmission member 20 toward the fixing sheet 30 or sandwiches the wire-like transmission member 20 and the fixing sheet 30 to keep them in a fixing state. In the description hereinafter, the wire-like transmission member 20 and the fixing sheet 30 are in the state of the contact area fixation.

Applicable as the configuration of the contact area fixation are a contact area indirect fixation and a contact area direct fixation, or both fixations may also be used together in different regions. Herein, the contact area indirect fixation indicates that the wire-like transmission member 20 and the fixing sheet 30 are indirectly stuck and fixed via an adhesive agent, a gluing agent, and a double-sided adhesive tape provided therebetween. The contact area direct fixation indicates that the wire-like transmission member 20 and the fixing sheet 30 are directly stuck and fixed without an intervention of the adhesive agent, for example, which is separately provided. Considered in the contact area direct fixation is that resin included in at least one of the wire-like transmission member 20 and the fixing sheet 30 is melted, thus the wire-like transmission member 20 and the fixing sheet 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the wire-like transmission member 20 and the fixing sheet 30 are in the state of the contact area direct fixation by these means. Specifically, when the state of the contact area direct fixation is formed by the ultrasonic welding, for example, the wire-like transmission member 20 and the fixing sheet 30 are in the state of the contact area direct fixation by the ultrasonic welding.

In the description hereinafter, the wire-like transmission member 20 and the fixing sheet 30 are in the state of the contact area direct fixation.

Each of the plurality of wire-like transmission members 20 may be fixed to the fixing sheet 30 at a plurality of positions at intervals along the longitudinal direction. Each of the plurality of wire-like transmission members 20 may be wholly fixed to the fixing sheet 30 continuously along the longitudinal direction.

The cover sheet 40 covers the other main surface of the fixing sheet 30. The cover sheet 40 is fixed to the other main surface of the fixing sheet 30. The cover sheet 40 is fixed to a portion of the fixing sheet 30 away from a portion where the wire-like transmission member 20 is fixed.

The cover sheet 40 may be wholly or partially overlapped with the fixing sheet 30. The cover sheet 40 may be formed of the same material as that of the fixing sheet 30, may also be formed of a different material. The cover sheet 40 may be a resin sheet. For example, the cover sheet 40 may be formed by resin such as PVC, PE, PP, or PET in the manner similar to the fixing sheet 30.

One of the fixing sheet 30 and the cover sheet 40 may have higher rigidity than the other one thereof. Herein, the cover sheet 40 is formed to have higher rigidity than the fixing sheet 30. For example, the cover sheet 40 is formed of a rigid resin material such as hard PVC, nylon, PET, and PP to have an evenly filled cross-sectional surface. It is also applicable that the cover sheet 40 can regulate bending of the wiring body 12. Described herein is that the cover sheet 40 has a single layer structure made up of one resin layer. The resin layer has higher rigidity than the fixing sheet 30. The cover sheet 40 may have a multilayer structure.

The cover sheet 40 and the fixing sheet 30 are fixed to each other while a surface of the resin layer of the cover sheet 40 and a surface of the fibrous material layer of the fixing sheet 30 have contact with each other. The cover sheet 40 and the fixing sheet 30 are fixed by fusion. A fixing state of fixing the cover sheet 40 and the fixing sheet 30 is not particularly limited as long as they are fixed by fusion, however, examples thereof include the following three states. The cover sheet 40 and the fixing sheet 30 may have a fusion state according to any state in the following three states, and it is preferable that at least one of the cover sheet 40 and the fixing sheet 30 is melted so that the cover sheet 40 and the fixing sheet 30 can be mutually fixed.

A first state is as follows. That is to say, in the resin layer of the cover sheet 40 and the fibrous material layer of the fixing sheet 30, the resin of the resin layer of the cover sheet 40 is heated and melted by the ultrasonic welding, for example, to have contact with the fixing sheet 30 and stuck thereto, and the cover sheet 40 and the fixing sheet 30 are fused to each other. At this time, it is also applicable that the resin of the resin layer in the cover sheet 40 has contact with only the surface of the fibrous material layer or penetrates inside the fibrous material layer. When the resin of the resin layer in the cover sheet 40 penetrates between the fibers in the fibrous material layer and is fixed thereto, such a configuration causes so-called anchor effect, thus the cover sheet 40 and the fixing sheet 30 are rigidly fixed. That is to say, the resin of the resin layer in the cover sheet 40 in a fluent state penetrates between the fibers of the fibrous material layer in the fixing sheet 30, and is then hardened. Maintained accordingly is a state where the resin of the resin layer in the cover sheet 40 penetrates between the fibers of the fibrous material layer in the fixing sheet 30, and the cover sheet 40 and the fixing sheet 30 are fixed to each other.

A second state is as follows. That is to say, the resin of the fixing layer in the fixing sheet 30 is melted and penetrates the fibrous material layer. Then, the resin of the fixing layer penetrating the fibrous material layer has contact with the surface of the cover sheet 40 and is stuck thereto, thus the cover sheet 40 and the fixing sheet 30 are fused to each other.

A third state is as follows. That is to say, the resin constituting the cover sheet 40 is melted and penetrates the fibrous material layer in the fixing sheet 30. The resin of the fixing layer in the fixing sheet 30 is also melted and penetrates the fibrous material layer. Then, the resin of the cover sheet 40 in the fibrous material layer and the resin of the fixing sheet 30 have contact and are stuck to each other, thus the cover sheet 40 and the fixing sheet 30 are fused to each other. In the third embodiment, the resin constituting the cover sheet 40 penetrates the fibrous material layer in the fixing sheet 30, thus such a configuration causes so-called anchor effect, and the cover sheet 40 and the fixing sheet 30 are rigidly fixed.

The cover sheet 40 is partially provided along a longitudinal direction of the fixing sheet 30. The cover sheet 40 includes a plurality of partial sheets 41, 42, 43, and 44. Each of the partial sheets 41, 42, 43, and 44 covers only a part of the fixing sheet 30 along the longitudinal direction. Each of the partial sheets 41, 42, 43, and 44 is provided at intervals along the longitudinal direction of the fixing sheet 30. The cover sheet 40 includes a branch cover portion. The branch cover portion covers a region including the branch portions DP1 and DP2. Herein, the partial sheets 41 and 42 cover the branch portions DP1 and DP2. The partial sheets 41 and 42 are branch cover portions, respectively. The cover sheet 40 may not include the branch cover portion. That is to say, the cover sheet 40 may cover a side closer to the terminal in relation to the branch portion DP.

Each of the partial sheets 41, 42, 43, and 44 is formed into a rectangular shape, however, a concave polygonal shape, a circular shape, or an oval shape, for example, are also applicable. Each of the partial sheets 41, 42, 43, and 44 includes a region covering the fixing sheet 30 different from each other. The partial sheets 41 and 42 are intermediate portions of the fixing sheet 30, and are provided in the branch portions DP1 and DP2. The partial sheet 43 is provided in an end portion of the fixing sheet 30. The partial sheet 44 is an intermediate portion of the fixing sheet 30, and is provided in a portion other than the branch portions DP1 and DP2.

The partial sheet 41 is provided in the branch portion DP1. The branch portion DP1 is a portion where the plurality of wire-like transmission members 20 are branched into four portions. Pour branch wires extend from a branch point in the branch portion DP1. In the four branch wires, two branch wires continuously formed around the branch point are perpendicular to each other. An angle between the two branch wires continuously formed around the branch point may not be a right angle.

As illustrated in FIG. 3, the partial sheet 41 is fused to the fixing sheet 30 at a position sandwiched between two branch wires continuously formed around the branch point, that is to say, a position corresponding to a crotch portion of the two branch wires continuously formed around the branch point. Accordingly, a fusion position WP1 in the partial sheet 41 as the branch cover portion fused to the fixing sheet 30 is provided in a position away from the branch portion DP1. The partial sheet 41 is fused to the fixing sheet 30 in positions of four crotch portions. The four fusion positions WP1 where the partial sheet 41 and the fixing sheet 30 are fused to each other are located in positions surrounding the branch portion DPL. Accordingly, the fusion position WP1 in the branch cover portion fused to the fixing sheet 30 is provided in a plurality of positions surrounding the branch portion DPL. The fusion position WP1 in the branch cover portion fused to the fixing sheet 30 may be provided in one position. It is sufficient that the fusion position WP1 is provided at least on a lateral side of the main wire in a longitudinal direction away from the branch wire. The fusion position WP1 is preferably provided at least on both lateral sides of the main wire in the longitudinal direction.

As illustrated in FIG. 4, the partial sheet 42 is provided in the branch portion DP2. The branch portion DP2 is a portion where the plurality of wire-like transmission members 20 are branched into three portions. Three branch wires extend from a branch point in the branch portion DP2. Two branch wires in the three branch wires mutually extend in opposite positions, and the remaining one branch wire extends in a direction intersecting with the directions in which the two branch wires extend. It can also be considered that the branch wire is branched from the main wire extending along one direction in the branch portion DP2. The main wire and the branch wire are perpendicular to each other. An angle between the main wire and the branch wire may not be a right angle.

The partial sheet 42 is fused to the fixing sheet 30 on a lateral side of the wire-like transmission member 20, for example. Accordingly, the fusion positions WP2 and WP3 in the partial sheet 42 as the branch cover portion fused to the fixing sheet 30 are provided in a position away from the branch portion DP2. The partial sheet 42 and the fixing sheet 30 are fused at three positions. Three fusion positions WP2 and WP3 where the partial sheet 42 and the fixing sheet 30 are fused to each other are located in positions surrounding the branch portion DP2. Accordingly, the fusion positions WP2 and WP3 in the branch cover portion fused to the fixing sheet 30 are provided in a plurality of positions surrounding the branch portion DP2. The fusion positions WP2 and WP3 in the branch cover portion fused to the fixing sheet 30 may be provided in one position. It is sufficient that the fusion positions WP2 and WP3 are provided at least on a lateral side of the main wire in the longitudinal direction away from the branch wire. The fusion positions WP2 and WP3 are preferably provided at least on both lateral sides of the main wire in the longitudinal direction. As illustrated in FIG. 4, one fusion position WP3 on one lateral side of the main wire (a side where the branch wire does not extend) may be larger than the two fusion positions WP2 on both lateral sides of the branch wire.

As illustrated in FIG. 5, the partial sheet 43 is provided in all of the plurality of (five herein) end portions in the fixing sheet 30. The partial sheet 43 needs not be provided in all of the plurality of end portions in the fixing sheet 30. The partial sheet 43 may be provided only in some end portions in the plurality of end portions in the fixing sheet 30. The state where the partial sheet 43 is provided in the end portion of the fixing sheet 30 herein indicates that one of an end edge of the partial sheet 43 and an end edge of the fixing sheet 30 is located within 20 mm from the other one thereof along the longitudinal direction.

The partial sheet 43 is fused to the fixing sheet 30 on a lateral side of the wire-like transmission member 20, for example. The partial sheet 43 and the fixing sheet 30 are fused at two positions. Two fusion positions WP4 where the partial sheet 43 and the fixing sheet 30 are fused to each other are located on both lateral sides of the wire-like transmission member 20. Two fusion positions WP4 where the partial sheet 43 and the fixing sheet 30 are fused to each other are located in both side edge portions of the fixing sheet 30.

The partial sheet 44 is provided in an intermediate portion of the fixing sheet 30 extending along one direction. The partial sheet 44 is fused to the fixing sheet 30 on a lateral side of the wire-like transmission member 20 in the manner similar to the partial sheet 43.

The partial sheets 41 and 42 cover a region including the branch portions DP1 and DP2. The partial sheets 41 and 42 are fixed to the fixing sheet 30 at a position away from the branch portions DP1 and DP2. The partial sheets 43 and 44 cover a region including a parallel portion. The parallel portion is a portion where some wire-like transmission members 20 in the plurality of wire-like transmission members 20 are located in parallel to each other. Fusion positions where the partial sheets 43 44 and the fixing sheet 30 are fused to each other are provided in both lateral sides of the parallel portion. Accordingly, the partial sheets 41 and 42 are an example of a first partial sheet. The partial sheets 43 and 44 are an example of a second partial sheet.

The double-sided adhesive member 50 is attached to the cover sheet 40. The double-sided adhesive member 50 includes two surfaces, both of which are formed into a sheet-like shape having an adhesive property. The double-sided adhesive member 50 is a member having an adhesive property in a portion having contact with the cover sheet 40 and also having an adhesive property in an opposite portion thereof. The double-sided adhesive member 50 adheres to an outer surface of the cover sheet 40 (a surface on a side opposite to a surface fixed to the wiring body 12) and planarly extends. An outer surface of the double-sided adhesive member 50 adheres to the adherend 80. An adhesive member may be provided on both surfaces of a base material sheet in the double-sided adhesive member 50. The double-sided adhesive member 50 may not include a base material sheet.

A region where the double-sided adhesive member 50 is provided for the wiring body 12 is appropriately set. Herein, the double-sided adhesive member 50 is wholly provided an outer surface of each of the partial sheets 41, 42, 43, and 44. Accordingly, the double-sided adhesive member 50 is formed into a rectangular shape to conform to an outer surface shape of each of the partial sheets 41, 42, 43, and 44. The double-sided adhesive member 50 may have a concave polygonal shape, a circular shape, or an oval shape, for example. The double-sided adhesive member 50 may also be formed into a shape different from the outer surface shape of each of the partial sheets 41, 42, 43, and 44. For example, the double-sided adhesive member 50 may be provided to have a frame-like shape following an outer edge of each of the partial sheets 41, 42, 43, and 44. When the cover sheet 40 is a large sheet such as the fixing sheet 30, the double-sided adhesive member 50 is preferably provided in a part of the cover sheet 40.

A surface of the cover sheet 40 having contact with the double-sided adhesive member 50 is referred to as a first contact surface CS1. A surface of the fixing sheet 30 having contact with the cover sheet 40 is referred to as a second contact surface CS2. Adhesive force between the first contact surface CS1 and the double-sided adhesive member 50 is larger than adhesive force between the second contact surface CS2 and the double-sided adhesive member 50 in a case where the double-sided adhesive member 50 is provided in the second contact surface CS2. The adhesive force can be evaluated using results separately tested in the same type of peeling test (for example, each test of JIS K6854), for example.

When only a part of the portion of the cover sheet 40 covering the fixing sheet 30 is fixed to the fixing sheet 30, the double-sided adhesive member 50 is provided in a portion of the fixing sheet 30 which is covered by the cover sheet 40 but is not fixed thereto to be able to measure the adhesive force between the second contact surface CS2 and the double-sided adhesive member 50. When the whole portion of the cover sheet 40 covering the fixing sheet 30 is fixed to the fixing sheet 30, the portion of the fixing sheet 30 which is not covered by the cover sheet 40 may also be considered the second contact surface CS2. That is to say, when the whole portion of the cover sheet 40 covering the fixing sheet 30 is fixed to the fixing sheet 30, the double-sided adhesive member 50 is provided in a portion of the fixing sheet 30 which is not covered by the cover sheet 40 to be able to measure the adhesive force between the second contact surface CS2 and the double-sided adhesive member 50.

As described above, the cover sheet 40 has the single layer structure made up of the resin layer having the evenly filled cross-sectional surface. The cover sheet 40 is fixed to the second layer 34 as the fibrous material layer in the fixing sheet 30 having the double layer structure made of the first layer 33 and the second layer 34. Thus, the first contact surface CS1 is a surface of the resin layer having the evenly filled cross-sectional surface. The second contact surface CS2 is a surface of the fibrous material layer. Accordingly, when the double-sided adhesive member 50 having the same size is provided in the first contact surface CS1 and the second contact surface CS2, an effective contact area of the first contact surface CS1 having contact with the double-sided adhesive member 50 is larger than an effective contact area of the second contact surface CS2 having contact with the double-sided adhesive member 50. Accordingly, easily obtained is a configuration that the adhesive force between the first contact surface CS1 and the double-sided adhesive member 50 is larger than that between the second contact surface CS2 and the double-sided adhesive member 50.

More specifically, the surface of the fibrous material layer has minute convex-concave portions caused by a flow of each of the plurality of fibers (for example, a gap between the fibers or bending of the fibers). When the double-sided adhesive member 50 is attached to the surface of the fibrous material layer, the double-sided adhesive member 50 has contact with convex portions and does not have contact with concave portions in the convex-concave portions. Thus, the effective contact area where the double-sided adhesive member 50 and the fibrous material layer have actually contact with each other is smaller than the size of the double-sided adhesive member 50. In the meanwhile, the surface of the resin layer having the evenly filled cross-sectional surface does not have convex-concave portions so much compared with the fibrous material layer. Thus, the effective contact area where the double-sided adhesive member 50 and the resin layer having the evenly filled cross-sectional surface have actually contact with each other is equal to or slightly smaller than the size of the double-sided adhesive member 50. Thus, the effective contact area of the first contact surface CS1 having contact with the double-sided adhesive member 50 is larger than the effective contact area of the second contact surface CS2 having contact with the double-sided adhesive member 50.

Figure 7:
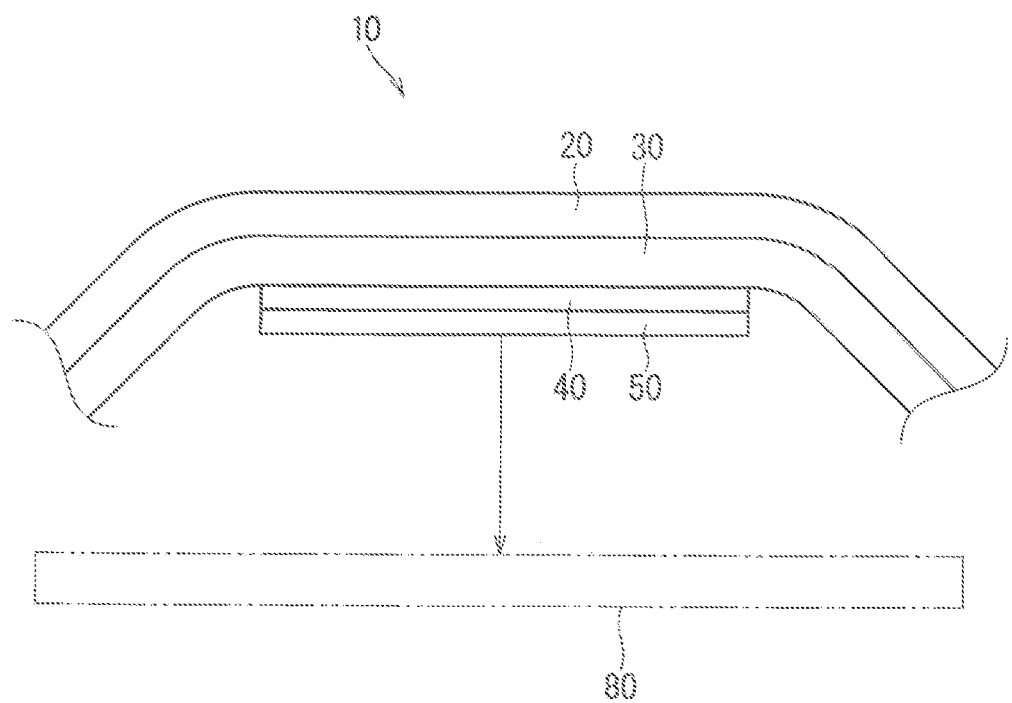
FIG. 7 is an explanation diagram illustrating a wiring member attached to an adherend.

FIG. 7 is an explanation diagram illustrating the wiring member 10 attached to the adherend 80.

Herein, the cover sheet 40 has higher rigidity than the fixing sheet 30. Thus, suppressed is a deflection of the wiring member 10 caused by a self-weight in a portion where the cover sheet 40 is provided, for example. Thus, the wiring member 10 is easily kept in a flat shape as illustrated in FIG. 7 in the portion where the cover sheet 40 is provided. As a result, the double-sided adhesive member 50 is easily attached to the adherend 80.

It is also considered that the fixing sheet 30 and the cover sheet 40 are fused after the wire-like transmission member 20 is fixed to the fixing sheet 30. Even in this case, according to the wiring member 10, the fusion positions WP1, WP2, and WP3 in the branch cover portion fused to the fixing sheet 30 are provided in positions away from the branch portions DP1 and DP2. Thus, it is suppressed that a jig for fusion catches the wire-like transmission member 20 at a time of fusing the fixing sheet 30 to the cover sheet 40. Accordingly, the other cover sheet 40 can be favorably fused to the fixing sheet 30 to which the wire-like transmission member 20 is fixed.

The fusion positions WP1. WP2, and WP3 in the branch cover portion fused to the fixing sheet 30 are provided in a plurality of positions surrounding the branch portions DP1 and DP2. Accordingly, the fixing sheet 30 and the cover sheet 40 are rigidly fixed to each other in the branch cover portion.

The cover sheet 40 is partially provided along the longitudinal direction of the fixing sheet 30. Accordingly, increase in weight of the wiring member 10 caused by providing the cover sheet 40 is suppressed.

The cover sheet 40 includes the partial sheets 41 and 42 as the first partial sheet and the partial sheets 43 and 44 as the second partial sheet. The first partial sheet is fixed to the fixing sheet 30 at a position away from the branch portions DP1 and DP2. The second partial sheet is fixed to the fixing sheet 30 at a position away from the parallel portion. Accordingly, the first partial sheet and the second partial sheet can be favorably fused to the fixing sheet.

The fixing sheet 30 includes the first route portion 31 and the second route portion 32. The branch cover portion covers only the first route portion 31 in the first route portion 31 and the second route portion 32. Accordingly, reduced is a region where the branch cover portion is provided in the fixing sheet 30.

The cover sheet 40 has higher rigidity than the fixing sheet 30. Accordingly, the shape of the wiring member 10 is held by the cover sheet 40. Accordingly, the portion of the wiring member 10 to which the cover sheet 40 is fixed is easily kept in a planar shape. Accordingly, the double-sided adhesive member 50 is also easily kept in a planar shape, and the double-sided adhesive member 50 is easily attached to the adherend 80.

The double-sided adhesive member 50 is attached to an outer surface of the cover sheet 40, and the double-sided adhesive member 50 is overlapped with the branch portions DP1 and DP2. Accordingly, the double-sided adhesive member 50 is provided in a relatively large region. Adhesive force between the outer surface of the cover sheet 40 and the double-sided adhesive member 50 is larger than adhesive force between the other main surface of the fixing sheet 30 and the double-sided adhesive member 50. Accordingly, fixing strength is higher in a case where the wiring member 10 is attached and fixed to the adherend 80 by the double-sided adhesive member 50 than in a case where the double-sided adhesive member 50 is provided on the fixing sheet 30.

Modification Example

Figure 8:
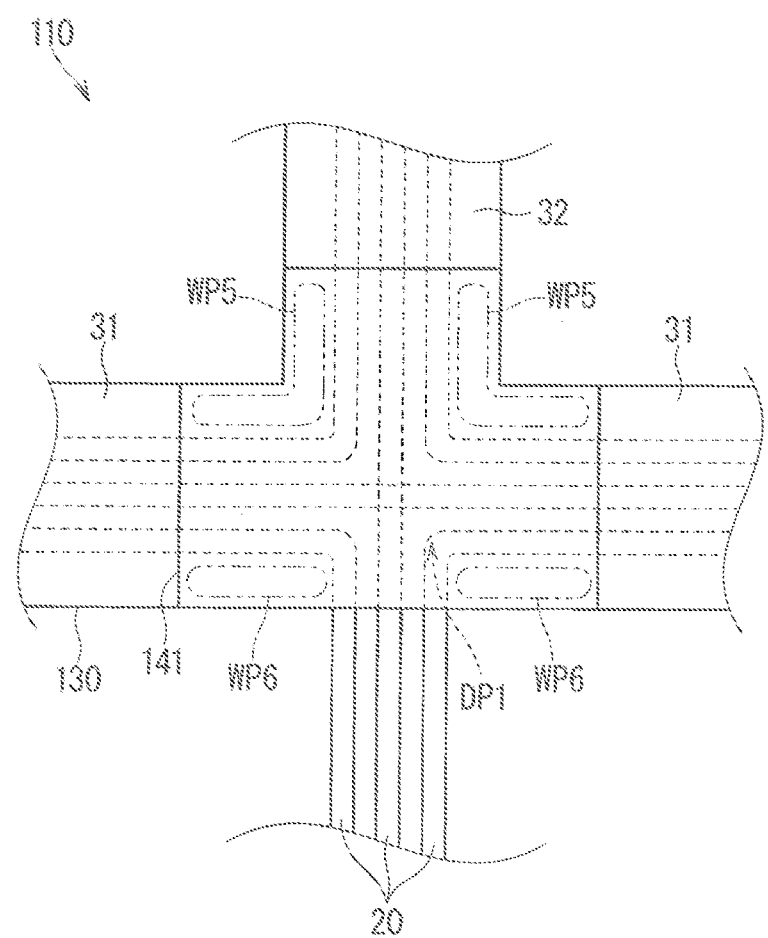
FIG. 8 is a back view illustrating a modification example of the wiring member.

FIG. 8 is a back view illustrating a modification example of the wiring member 10.

Shapes of a fixing sheet 130 and a partial sheet 141 in the branch portion DP1 are different in the wiring member 110 illustrated in FIG. 8.

The number of branches of the fixing sheet 130 in the branch portion DP1 is smaller than that of branches of the plurality of wire-like transmission member 20. The plurality of wire-like transmission members 20 are branched into four portions, and in the meanwhile, the fixing sheet 130 is branched into three portions. Only one second route portion 32 is branched from the first route portion 31. The fixing sheet 130 is not elongated in a direction of one branch wire. The one branch wire extends from a side edge of the fixing sheet 130 to an outer side of the fixing sheet 130. There may also be a case where the fixing sheet 130 is not branched in the branch portions DP1 and DP2.

The partial sheet 141 is branched in a direction in which the fixing sheet 130 is branched. Herein, the partial sheet 141 is branched into three portions. The partial sheet 141 as the branch cover portion is formed into a branched shape to cover both the first route portion 31 and the second route portion 32. The partial sheet 141 is formed into a concave octagon shape with two re-entrant angles. The partial sheet 42 may be formed into a shape branched into three portions as with the partial sheet 141. The partial sheet 41 may be formed into a shape branched into four portions when the fixing sheet 30 is branched into four portions in the branch portion DP1.

The partial sheet 141 and the fixing sheet 130 are fused at four positions. Two fusion positions WP5 in four fusion positions WP5 and WP6 are provided in portions of the partial sheet 141 each having a re-entrant angle. Each fusion position WP5 is provided to extend along two sides having the re-entrant angle. Each fusion position WP5 has an L-like shape. The remaining two fusion positions WP6 in four fusion positions WP5 and WP6 are elongated in one side. The fusion positions WP5 and WP6 are provided in a region larger than the fusion position WP1. Accordingly, fixing strength between the partial sheet 141 and the fixing sheet 130 is increased.

The double-sided adhesive member 50 may be wholly provided in the partial sheet 141. The double-sided adhesive member 50 may also be provided to have a rectangular shape in a portion including the branch point in the manner similar to FIG. 5.

According to the wiring member 110 of the present example, the partial sheet 141 covers both the first route portion 31 and the second route portion 32. Accordingly, the partial sheet 141 as the branch cover portion also has a branched shape. At this time, when the partial sheet 141 has higher rigidity than the fixing sheet 30, a route of a base end portion of the branch wire can be regulated by the portion of the partial sheet 141 covering the second route portion 32.

In the branch portion DP1, some of the wire-like transmission members 20 in the plurality of wire-like transmission members 20 are branched from the other wire-like transmission members 20 on the fixing sheet 130, and extends from the side edge of the fixing sheet 130 to an outer side. Accordingly, reduced is a region where the fixing sheet 130 and the cover sheet 40 are provided on the wire-like transmission member 20, and increase in weight of the wiring member 110 can be suppressed.

In addition, in the description of the embodiment, the double-sided adhesive member 50 is provided on the outer surface of the cover sheet 40, however, this configuration is not necessary. The double-sided adhesive member 50 may not be provided on the outer surface of the cover sheet 40. In this case, the wiring member is considered to be locked and fixed to an adherend by a locking member such as a clamp.

In the description of the embodiment, the cover sheet 40 has higher rigidity than the fixing sheet 30, however, this configuration is not necessary. The cover sheet 40 may have the same or lower rigidity than the fixing sheet 30. For example, the cover sheet 40 may be a film.

In the description of the embodiment, the plurality of partial sheets 41, 42, 43, and 44 are provided, however, this configuration is not necessary. The partial sheets 41, 42, 43, and 44 can be appropriately omitted or added. At least one of the partial sheets 41 and 42 in the partial sheets 41, 42, 43, and 44 is preferably provided.

In the description of the embodiment, the first contact surface CS1 is the surface of the resin layer having the evenly filled cross-sectional surface, and the second contact surface CS2 is the surface of the fibrous material layer, thus the adhesive force between the first contact surface CS1 and the double-sided adhesive member 50 is larger than that between the second contact surface CS2 and the double-sided adhesive member 50, however, this configuration is not necessary. The other combination may be applied to the first contact surface CS1 and the second contact surface CS2. For example, it is also applicable that both the first contact surface CS1 and the second contact surface CS2 are surfaces of resin layers each having an evenly filled cross-sectional surface and the first contact surface CS1 is formed more flatly than the second contact surface CS2. That is to say, the first contact surface CS1 may be formed to have less convex-concave portions (smaller surface roughness) in the surface than the second contact surface CS2. For example, applicable is a member that a material constituting the first contact surface CS1 has better compatibility with the double-sided adhesive member 50 than a material constituting the second contact surface CS2.

The wiring member 10 is also considered to be transported in a state where the double-sided adhesive member 50 does not adhere to the adherend 80. In this case, it is preferable that the wiring member 10 further includes a peeling member provided on the outer surface of the double-sided adhesive member 50 in a state before the double-sided adhesive member 50 adheres to the adherend 80.

Each configuration described in the embodiment and each modification example can be appropriately combined as long as they are not contradictory.

EXPLANATION OF REFERENCE SIGNS

10, 110 wiring member
12 wiring body
20 wire-like transmission member
22 transmission wire body
24 covering layer
30, 130 fixing sheet
31 first route portion
32 second route portion
33 first layer
34 second layer
40 cover sheet
41, 42, 141 partial sheet (branch cover portion)
43, 44 partial sheet
50 double-sided adhesive member
80 adherend
C connector
CS1 first contact surface
CS2 second contact surface
WP1, WP2, WP3, WP4, WP5, WP6 fusion position
DP, DP1, DP2 branch portion

The invention claimed is:

1. A wiring member, comprising:
   a main wire including a plurality of wire-like transmission members;
   a branch wire including at least one of the plurality of wire-like transmission members which is branched from the main wire;
   a fixing sheet having one main surface to which the main wire is fixed; and
   a cover sheet, at least a part of which is provided in a position overlapped with the branch wire in another main surface of the fixing sheet, wherein
   a fusion position where the fixing sheet and the cover sheet are fused is provided on at least a lateral side of the main wire in a longitudinal direction, and is provided in a position away from the branch wire,
   a double-sided adhesive member is attached to an outer surface of the cover sheet,
   the double-sided adhesive member is overlapped with a branch point of the branch wire, wherein the at least one of the wire-like transmission members is branched from the main wire at the branch point, and
   material of the another main surface of the fixing sheet is different from material of the outer surface of the cover sheet such that an adhesive force exhibited in a peeling test according to JIS K6854 between the material of the outer surface and material of the double-sided adhesive member is larger than an adhesive force exhibited in the peeling test between the material of the another main surface and the material of the double-sided adhesive member.

2. The wiring member according to claim 1, wherein fusion positions including the fusion position where the fixing sheet and the cover sheet are fused are provided on at least both ends of a lateral side of the main wire in the longitudinal direction.

3. The wiring member according to claim 1, wherein the cover sheet includes a branch cover portion overlapped with the branch point.

4. The wiring member according to claim 3, wherein fusion positions where the fixing sheet and the cover sheet are fused in the branch cover portion are provided in a plurality of positions surrounding the branch point.

5. The wiring member according to claim 1, wherein the cover sheet is partially provided along a longitudinal direction of the fixing sheet.

6. The wiring member according to claim 5, wherein the cover sheet includes a first partial sheet and a second partial sheet provided at intervals along the longitudinal direction of the fixing sheet,
   the first partial sheet covers a region including the branch portion point,
   the second partial sheet covers a region including a parallel portion in which at least two wire-like transmission members in the plurality of wire-like transmission members are located in parallel to each other and the branch point is not included, and
   fusion positions where the second partial sheet and the fixing sheet are fused are provided on both lateral sides of the at least two wire-like transmission members in the parallel portion.

7. The wiring member according to claim 5, wherein the fixing sheet includes a first route portion and a second route portion branched from the first route portion,
   the at least one of the plurality of wire-like transmission members is branched from another some of the wire-like transmission members of the main wire at the branch point in the first route portion and fixed on the second route portion, and
   a part of the cover sheet covering the branch point covers only the first route portion in the first route portion and the second route portion.

8. The wiring member according to claim 1, wherein the fixing sheet includes a first route portion and a second route portion branched from the first route portion,
   the at least one of the plurality of wire-like transmission members is branched from another some of the wire-like transmission members of the main wire at the branch point in the first route portion and extend along the second route portion, and
   a part of the cover sheet covering the branch point has a branched shape to cover both the first route portion and the second route portion.

9. The wiring member according to claim 1, wherein the at least one of the plurality of wire-like transmission members is branched from another some of the wire-like transmission members of the main wire on the fixing sheet at the branch point, and extends to an outer side from a side edge of the fixing sheet.

10. The wiring member according to claim 1, wherein the cover sheet has higher rigidity than the fixing sheet.

11. The wiring member according to claim 1, wherein the main surface of the fixing sheet is a fibrous material layer and the outer surface of the cover sheet is a resin layer.

* * * * *